3,637,569
PROCESS FOR PREPARING FLUOROCARBON RESIN ORGANOSOLS
James C. Fang, Media, Pa., assignor to E. I. du Pont de Nemours and Company, Wilmington, Del.
No Drawing. Continuation-in-part of applications Ser. No. 413,333, Nov. 23, 1964, Ser. No. 528,047, Feb. 17, 1966, Ser. No. 654,333, July 19, 1967, Ser. No. 738,821, June 21, 1968, and Ser. No. 19,062, Mar. 12, 1970. This application July 1, 1970, Ser. No. 51,717
Int. Cl. B01f 3/12; C08f 45/28, 45/34
U.S. Cl. 260—32.8 R      6 Claims

ABSTRACT OF THE DISCLOSURE

A process for preparing a dispersion of tetrafluoroethylene/hexafluoropropylene copolymer in an organic liquid, which comprises mixing an organic liquid with an aqueous dispersion of copolymer, boiling the mixture, taking off the resulting azeotrope, separating the water from the azeotrope and returning the organic liquid to the boiling mass until it is substantially anhydrous.

CROSS-REFERENCES TO RELATED APPLICATIONS

This application is a continuation-in-part of applications Ser. Nos. 413,333 filed Nov. 23, 1964; 528,047 filed Feb. 17, 1966; 654,333 filed July 19, 1967; 738,821 filed June 21, 1968 and 19,062 filed Mar. 12, 1970, all now abandoned.

BACKGROUND OF THE INVENTION

This invention relates to a process for preparing dispersions of tetrafluoroethylene/hexafluoropropylene copolymers in organic liquids.

Aqueous dispersions of tetrafluoroethylene/hexafluoropropylene copolymers have been known for some time and have been extensively used to coat and impregnate articles with these polymers. These aqueous dispersions, however, have a tendency to coagulate irreversibly when subjected to excessive heat, freezing, mechanical agitation, or on the addition of electrolytes or water soluble solvents. They are also difficult to bond firmly to metal substrates without expensive and bothersome pretreatments.

In an attempt to prepare compositions without these shortcomings, dispersions of these polymers have been prepared in organic liquids. These dispersions, however, have been unsatisfactory because they coagulate undesirably and settle quickly. This makes them unsuitable for commercial use.

The process of this invention makes possible the preparation of dispersions having none of these shortcomings. They are remarkably stable to coagulation, resist settling, and moreover, permit firm bonding of coatings to metal substrates without the pretreatment required when aqueous dispersions are used.

SUMMARY OF THE INVENTION

The copolymers used to prepare the dispersions are the tetrafluoroethylene (TFE)/hexafluoropropylene (HFP) copolymers. This designation takes in a whole family of TFE/HFP copolymers, in TFE/HFP weight ratios of from 5–95/5–95. The preferred copolymers, because of the stability of their dispersions, are the 50–95/5–50 TFE/HFP copolymers. Even more preferred are the 75–95/5–25 TFE/HFP copolymers. Most preferred are the 93–95/5–7, the 84–88/12–16 and the 75–80/20–25 copolymers, specifically the 95/5, 85/15 and the 75/25 copolymers. The 1–5/95–99 copolymers can also be used, as can those whose TFE/HFP monomer ratios range from 95–100/0–5.

Methods for the preparation of such copolymers are described in U.S. Pat. 2,946,763 to M. I. Bro et al.

The TFE/HFP copolymers should have molecular weights of at least about 20,000, for materials with molecular weights less than this tend to be waxy and unsuited for preparing dispersions in organic liquids.

Preparation of the dispersion

According to the invention, the dispersions are prepared from aqueous dispersions of the copolymers whose particles have an average particle radius of from about 0.01 to about 3 microns, with no more than 50% of these particles being larger than 3 microns in radius.[1] Such aqueous dispersions can in turn be prepared according to the methods disclosed in the previously mentioned Bro patent, or can be obtained commercially.

The aqueous phase of this starting dispersion is displaced with an organic liquid phase. Any organic liquid can be used which has a surface tension of less than about 40 dynes per centimeter,[2] preferably 20 to 30 dynes per centimeter, which forms a water/organic liquid azeotrope and which does not physically or chemically interfere with the copolymer dispersion. Illustrative of such liquids are aromatic hydrocarbons such as benzene, toluene and xylene; alcohols; ketones such as methyl isobutyl ketone; mineral spirits; naphtha; and chlorinated hydrocarbons such as chloroform, carbon tetrachloride, trichloroethylene, perchloroethylene and "Freon®" fluorocarbons. Of these, toluene and methyl isobutyl ketone give the best results.

The organic liquid is mixed with up to 50% (by volume) of an aqueous TFE/HFP copolymer dispersion, preferably containing about 55% solids. Boiling is then begun and the water/organic liquid azeotrope is continuously distilled off. This azeotrope is collected, condensed and the organic liquid phase is separated by conventional methods and returned to the vessel. Distillation is continued until the material remaining in the vessel is substantially anhydrous. "Substantially anhydrous," as it is used in this context, means less than about 1.0%, by weight, of water.

If the resulting product is slightly coagulated, it can be milled, preferably in a ball or pebble mill, for from 2–100 hours, the period depending on the degree of coagulation. As a general rule, 24 hours of milling is enough.

The dispersions prepared in this way contain discrete copolymer particles having an average radius of about 0.01 to about 3 microns, no more than 50% (by weight) of the particles having radii larger than 3 microns. Generally speaking, stability of the dispersions increases with decreasing particle size. Highly preferred dispersions ---
[1] Measured by direct microscopic examination at a magnification of about 750 diameters. Particle dimensions can be measured by comparison with an eye-piece scale or by direct comparison with markings on a calibrated slide.
  Particle size can also be measured by the angular dependent light scattering method described by Aughey et al. in J. Opt. Soc. Am., 44, 833 (1954).
  Particles smaller than about 1.0 micron can be measured by electron microscopy.
[2] Measured at 25° C. by the Du Nouy ring method, as described in American Society for Testing Materials, Method D 1331–56.

therefore have particles whose average radius ranges from 0.01 to 0.9 micron.

The dispersions contain from about 1% to about 50%, by weight, of particulate copolymer. Dispersions preferred for their stability contain about 30–40%, by weight, of copolymer. The dispersions will vary in viscosity according to their solids content and according to the organic liquids used, and can range from free-flowing to thixotropic viscid fluids.

The dispersions are highly stable. They can remain in storage for extended periods with no appreciable coagulation or changes in viscosity. If over a period of time slight settling should occur, the particles can be easily redispersed by agitating the dispersions briefly. In addition, the dispersions do not coagulate on heating, freezing, agitation or on addition of salts, electrolytes or other miscible organic liquids.

Utility

These dispersions are suitable for direct use as coating compositions, but pigments otherwise suitable for use in organic coating compositions can be added if desirable. The compositions can be applied by such conventional methods as spraying, brushing, dipping or roller coating. They air dry quickly, leaving behind powdery residues of copolymer which give the coated articles lubricious surfaces. The dispersions are therefore highly useful as lubricating sprays for industrial and household purposes. Those dispersions in which the organic liquid is a "Freon®" fluorocarbon can be packaged in conventional aerosol spray cans.

Tough, permanent, continuous, lubricious films of the TFE/HFP copolymers can be produced on any substrate capable of withstanding the heat treatment involved by applying a dispersion of the invention to a substrate and then heating it to a temperature of from about 400–750° F. for 10–30 minutes. Such fused films are a boon on kitchen utensils and ice-cube trays, where they prevent sticking and caking. The films also have good electrical insulating properties.

DESCRIPTION OF THE PREFERRED EMBODIMENTS

The following examples are submitted so that the invention can be more easily understood and readily practiced. They are intended to be illustrative and show only the preferred embodiments of the invention. Those skilled in the art will no doubt be able to compose numerous variations on the central theme. It is fully intended that these variations be considered part of the basic inventive concept.

In the examples, all proportions are by weight unless otherwise indicated.

Example 1

A glass pot was charged with 1300 parts of toluene, which was then heated to 108° C., with slow stirring. At 108° C., the stirring rate was increased and 1000 parts of an aqueous dispersion of an 85/15 TFE/HFP copolymer, containing 52% solids and having an average particle radius of about 1 micron (with no particles larger than 3 microns radius), were added dropwise.

The pot temperature was maintained between 86–110° C. for about 4 hours. The water/toluene azeotrope was continuously removed and condensed. The toluene phase was separated and returned to the pot. After 480 parts of water had been collected, heating was discontinued and the batch was cooled to give about 1820 parts of a white thixotropic dispersion containing 28.6% solids.

This was ground with glass beads for 24 hours to give a highly stable dispersion containing TFE/HFP copolymer particles having an average radius of about 1 micron (with no particles larger than 3 microns radius). The water content of the dispersion, as determined by Karl Fisher Analysis, was found to be 0.0009–0.013%.

The dispersion can be stored for extended periods with no irreversible settling, and does not coagulate when heated, frozen or when miscible solvents are added.

The dispersion was brushed on an aluminum panel and allowed to air dry. The resulting powdery film gave the panel a lubricious finish.

Example 2

Five hundred parts of methyl isobutyl ketone were charged into a glass pot. The ketone was heated to 116° C. with mild agitation. At 116° C., the rate of stirring was increased and 500 parts of an aqueous dispersion of TFE/HFP copolymer like that described in Example 1, containing 53% solids, were added to the pot, dropwise, over a one-hour period.

The pot temperature dropped to 89° C. in 15 minutes and remained there for 45 minutes more. The water/methyl isobutyl ketone azeotrope was continuously collected during this period. The methyl isobutyl ketone phase was separated and returned to the pot.

The final pot temperature was 116° C. The product, 780 parts, was a white thixotropic dispersion having a solids content of about 34.4%. The radii of the polymer particles, as determined by the light scattering method, ranged from 0.11–1.3 microns, the average being about 1.0 micron.

After being ground with glass beads for 2 hours, this dispersion had the same physical characteristics and properties as those described for the dispersion in Example 1. The water content was 0.05%.

I claim:
1. A process for preparing an organosol of a TFE/HFP copolymer, said process comprising
   (A) mixing an organic liquid which has a surface tension below about 40 dynes per centimeter (measured at 25° C.), is capable of forming a azeotrope with water and which does not chemically or physically interfere with the polymer dispersion with up to 50% by volume of an aqueous dispersion of TFE/HFP copolymer particles having an average particle radius of from about 0.01 to about 3 microns, with no more than 50% of the particles being larger than three microns in radius, said copolymer having a molecular weight of at least 20,000, in a vessel;
   (B) boiling the mixture; and
   (C) withdrawing the vapors of the resulting water/organic liquid azeotrope, separating the organic liquid from the water and returning the organic liquid to the vessel, until the organic liquid in the vessel contains less than about 1.0%, by weight, of water.
2. A process for preparing an organosol of a TFE/HFP copolymer, said process comprising
   (A) mixing an organic liquid which has a surface tension below about 40 dynes per centimeter (measured at 25° C.) and is capable of forming an azeotrope with water and which does not chemically or physically interfere with the polymer dispersion with up to 50% by volume of an aqueous dispersion of TFE/HFP copolymer particles having an average particle radius of from about 0.01 to about 3 microns, with no more than 50% of the particles being larger than three microns in radius, said copolymer having a molecular weight of at least 20,000, in a vessel;
   (B) boiling the mixture;
   (C) withdrawing the vapors of the resulting water/organic liquid azeotrope, separating the organic liquid from the water and returning the organic liquid to the vessel, until the organic liquid in the vessel contains less than about 1%, by weight, of water; and then
   (D) milling the resulting material until the copolymer particles have an average radius of from about 0.01 to about 3 microns, with no more than 50% of the particles being larger than 3 microns in radius.

3. The process of claim 1 wherein the organic liquid is methyl isobutyl ketone.

4. The process of claim 2 wherein the organic liquid is methyl isobutyl ketone.

5. The process of claim 1 wherein the organic liquid is toluene.

6. The process of claim 2 wherein the organic liquid is toluene.

References Cited
UNITED STATES PATENTS

| | | | |
|---|---|---|---|
| 2,328,399 | 8/1943 | Saunders et al. | 203—14 |
| 2,946,763 | 7/1960 | Bro et al. | 260—900 |

ALLAN LIEBERMAN, Primary Examiner

U.S. Cl. X.R.

260—33.6 F, 33.8 F, 34.2